(No Model.)
L. PROVANCHER.
Carriage Axle.
No. 238,964. Patented March 15, 1881.
Fig. 1.
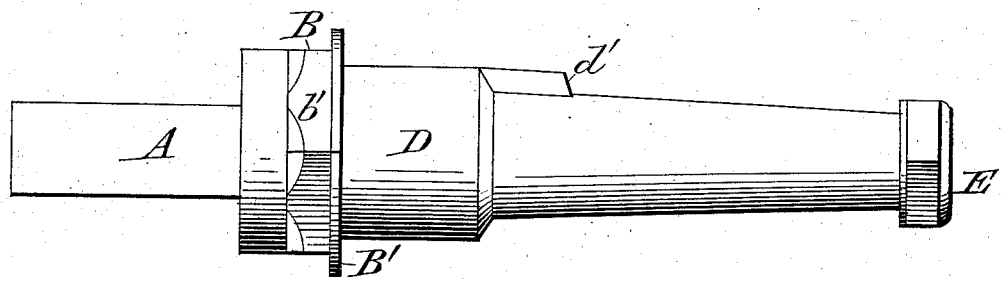
Fig. 2.
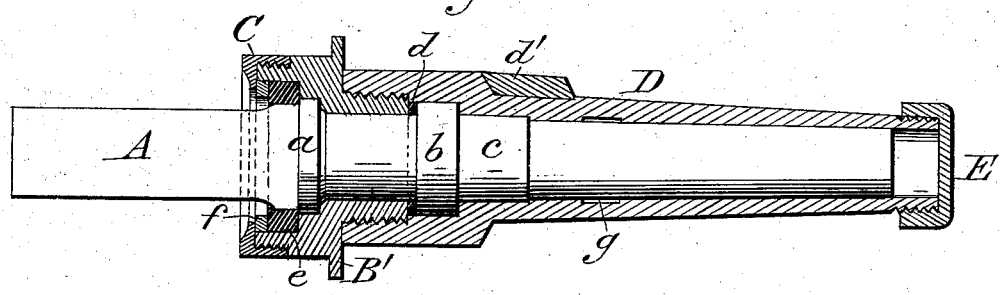
Fig. 3.    Fig. 4.    Fig. 5.
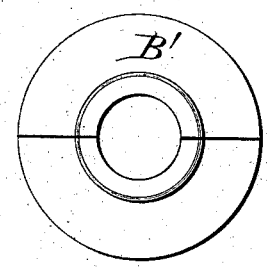 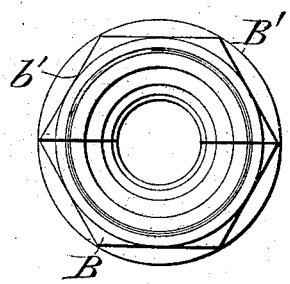 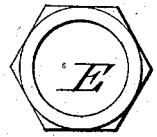
Attest:
F. H. Schott
A. R. Bonn
Inventor:
Ludger Provancher
by C. H. Watson & Co, attys

UNITED STATES PATENT OFFICE.

LUDGER PROVANCHER, OF DENVER, COLORADO, ASSIGNOR OF ONE-HALF TO THOMAS N. BRIEN, OF SAME PLACE.

CARRIAGE-AXLE.

SPECIFICATION forming part of Letters Patent No. 238,964, dated March 15, 1881.

Application filed October 23, 1880. (No model.)

*To all whom it may concern:*

Be it known that I, LUDGER PROVANCHER, of Denver, in the county of Arapahoe and State of Colorado, have invented certain new and useful Improvements in Axles; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to hub-attaching devices for vehicle-axles; and it consists in the construction, arrangement, and combination of parts, as hereinafter more fully described, and specifically pointed out in the claim.

In the annexed drawings, Figure 1 is a side view of my improved axle with attaching devices. Fig. 2 is a longitudinal section of the same. Figs. 3 and 4 are opposite end views of the divided or split nut, and Fig. 5 is a view of the oil-cap.

The outer cylindrical end of the axle A is slightly tapered and formed with rings or projecting shoulders $a\ b\ c$. A suitable packing-ring, $d$, of equal diameter with the shoulder $b$, is placed so as to rest against the inner side of the latter, around the axle, and a similar packing-ring, $e$, but of larger size, is also placed around the axle, on the inner side of the shoulder $a$, beyond which it projects. The metallic packing-ring or washer $f$ is placed against the leather or rubber ring $e$, and the divided nut B having been placed in position with its outer end resting against the leather packing-ring $d$, the two parts of the divided nut are firmly secured together by means of the flanged ring C, which is screwed onto their inner ends.

The inner end of the divided nut B is of greater diameter than its outer end, and the nut is formed with screw-threaded necks, that engage with corresponding threads within the ring C and axle-box D. It is also provided with internal shoulders, that correspond with the rings $f\ e$ and axle-shoulder $a$, and with an external flange or shoulder, B′, and flat faces $b'\ b'$. The nut B and ring C having been firmly attached, as above described, will secure a close fit of the parts and yet allow them to move freely around the axle.

While the nut B is held by a wrench applied to the faces $b'$, the hub may be attached by turning the wheel, and thus screwing the axle-box D into place until its inner end rests firmly against the shoulder B′.

The axle-box D has an enlarged inner end provided with internal screw-threads for attachment to the nut B, and at its opposite end is externally threaded for the attachment of the oil cap or nut E. Its inner surface is shouldered to fit against the axle-shoulders $b\ c$, and it is also provided with an oil-groove, $g$. The axle-box is kept in place within the hub, and prevented from turning or working loose by means of the feather $d'$, formed on its outer surface, the cap E and shoulder B′ also contributing to the same result.

By means of the cap E at one end, and the close connection of the flanged ring C and washers $f\ e$ with the nut B and axle-shoulder $a$ at the other end, the entrance of sand and escape of oil are effectually prevented.

The hub and axle-box are securely attached to the axle in such a manner that they may be readily removed and replaced, when desired, for repairs or other purposes.

Having thus described my invention, what I claim as new, and desire to secure by Letters Patent, is—

The combination of the axle A, having the shoulders $a\ b\ c$, divided nut B, having flange B′ and faces $b'$, flanged ring C, washers $d\ e\ f$, axle-box D, having feather $d'$ and oil-groove $g$, and the cap E, all constructed and arranged as and for the purpose specified.

In testimony that I claim the foregoing as my own I have hereto affixed my signature in presence of two witnesses.

<div style="text-align:center">
his<br>
LUDGER × PROVANCHER.<br>
mark.
</div>

Witnesses:
THOS. W. LIPSCOMB,
LOUIS BRIEN.